US011537949B2

(12) United States Patent
Choi et al.

(10) Patent No.: US 11,537,949 B2
(45) Date of Patent: Dec. 27, 2022

(54) SYSTEMS AND METHODS FOR REDUCING IDLENESS IN A MACHINE-LEARNING TRAINING SYSTEM USING DATA ECHOING

(71) Applicant: Google LLC, Mountain View, CA (US)

(72) Inventors: Dami Choi, Toronto (CA); Alexandre Tachard Passos, San Francisco, CA (US); Christopher James Shallue, Mountain View, CA (US); George Edward Dahl, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 410 days.

(21) Appl. No.: 16/871,527

(22) Filed: May 11, 2020

(65) Prior Publication Data
US 2020/0372407 A1 Nov. 26, 2020

Related U.S. Application Data

(60) Provisional application No. 62/852,056, filed on May 23, 2019.

(51) Int. Cl.
*G06N 20/00* (2019.01)
*G06N 3/08* (2006.01)

(52) U.S. Cl.
CPC ............. *G06N 20/00* (2019.01); *G06N 3/084* (2013.01)

(58) Field of Classification Search
None
See application file for complete search history.

(56) References Cited

U.S. PATENT DOCUMENTS

| | | | |
|---|---|---|---|
| 10,318,882 B2 * | 6/2019 | Brueckner | H04L 67/10 |
| 2018/0181503 A1 * | 6/2018 | Nicol | G06F 13/1689 |
| 2019/0042915 A1 * | 2/2019 | Akin | G06N 3/063 |
| 2019/0220703 A1 * | 7/2019 | Prakash | G06F 9/505 |
| 2020/0349468 A1 * | 11/2020 | Arya | G06F 16/953 |
| 2021/0217130 A1 * | 7/2021 | Nurvitadhi | G06F 12/0815 |

OTHER PUBLICATIONS

Jouppi et al., "In-Datacenter Performance Analysis of a Tensor Processing Unit," ACM, 2017, 12pg. (Year: 2017).*
Liu et al., "Processing-in-Memory for Energy-efficient Neural Network Training: A Heterogeneous Approach," ACM, 2018, 14pg. (Year: 2018).*

* cited by examiner

*Primary Examiner* — Ryan D. Coyer
(74) *Attorney, Agent, or Firm* — Dority & Manning, P.A.

(57) ABSTRACT

A method for reducing idleness in a machine-learning training system can include performing operations by computing devices. A first set of training operations can access and prepare a plurality of training examples of a set of training data. A second set of training operations can train a machine-learned model based at least in part on the set of training data and can include one or more repeat iterations in which at least a portion of the second set of training operations is repeatedly performed such that the training example(s) are repeatedly used to train the machine-learned model. A rate of the repeat iteration(s) can be based at least in part on an echo factor that can be based at least in part on a comparison of a first computational time of the first set of training operations to a second computational time of the second set of training operations.

20 Claims, 6 Drawing Sheets

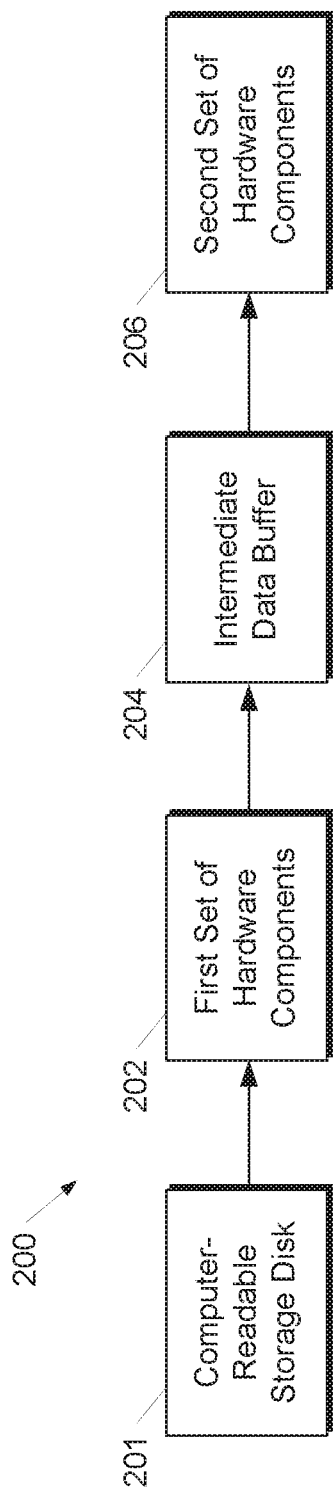

SYSTEMS AND METHODS FOR REDUCING IDLENESS IN A MACHINE-LEARNING TRAINING SYSTEM USING DATA ECHOING

CROSS-REFERENCE TO RELATED APPLICATIONS

The present application claims priority to U.S. Provisional Patent Application Ser. No. 62/852,056, filed May 23, 2019, the disclosure of which is hereby incorporated herein by reference in its entirety for all purposes.

FIELD

The present disclosure relates generally to training of machine-learned models. More particularly, the present disclosure relates to a system and method for reducing idleness in a machine-learning training system.

BACKGROUND

Training of machine-learned models can generally be divided into data pre-processing steps and subsequent training steps using the processed data. The data pre-processing steps can often take longer than the subsequent training steps. For example, specialized hardware has been developed that greatly increases the speed of parallel processing, which is common during the training steps. In various instances, such specialized hardware can be referred to as "accelerated" hardware, "accelerators," application specific integrated circuits (ASICs), and/or other terminology. Example specialized hardware includes graphics processing units (GPUs), tensor processing units (TPUs), and/or the like. As a result of such specialized hardware (and other factors), performance of the training steps can start and stop as pre-processed training data becomes intermittently available. Accordingly, a system and method for reducing idleness in machine-learning training systems would be welcomed in the art.

SUMMARY

Aspects and advantages of embodiments of the present disclosure will be set forth in part in the following description, or can be learned from the description, or can be learned through practice of the embodiments.

One example aspect of the present disclosure is directed to a method for reducing idleness in a machine-learning training system can include performing, by one or more computing devices, a first set of training operations to access and prepare a plurality of training examples included in a set of training data; and performing, by the one or more computing devices, a second set of training operations to train a machine-learned model based at least in part on the set of training data. Performing the second set of training operations can include performing, by the one or more computing devices, one or more repeat iterations in which at least a portion of the second set of training operations are repeatedly performed for at least one training example of the plurality of training examples included in the set of training data such that the at least one training example is repeatedly used to train the machine-learned model. A rate of the one or more repeat iterations can be based at least in part on an echo factor that is based at least in part on a comparison of a first computational time associated with performance of the first set of training operations to a second computational time associated with performance of the second set of training operations.

Another example aspect of the present disclosure is directed to a computing system configured to perform a training process to train a machine-learned model based on a set training data that can include a plurality of training examples. The computing system can include a computer-readable storage disk configured to store the plurality of training examples and a first set of hardware components configured to execute a first set of training operations to access the plurality of training examples from the computer-readable storage disk, prepare the plurality of training examples for use in training the machine-learned model, and store the prepared training examples at an intermediate data buffer. The intermediate data buffer can be configured to store the prepared training examples. The computing system can include a second set of hardware components configured to execute a second set of training operations to access the prepared training examples from the intermediate data buffer and to use the prepared training examples to train the machine-learned model. The second set of hardware components can be configured to perform one or more repeat iterations in which the second set of hardware components repeatedly access at least one of the prepared training examples from the intermediate data buffer and repeatedly use the at least one of the prepared training examples to train the machine-learned model. A rate at which the second set of hardware components is configured to perform the one or more repeat iterations can be based at least in part on an echo factor that is based at least in part on a comparison of a first computational time associated with performance of the first set of training operations by the first set of hardware components to a second computational time associated with performance of the second set of training operations by the second set of hardware components.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 is a simplified schematic drawing of a computing system for reducing idleness in a machine-learning training system according to example embodiments of the present disclosure FIG. 3 depicts a block diagram of an example machine-learned model according to example embodiments of the present disclosure.

DETAILED DESCRIPTION

Overview

Figure 1A:
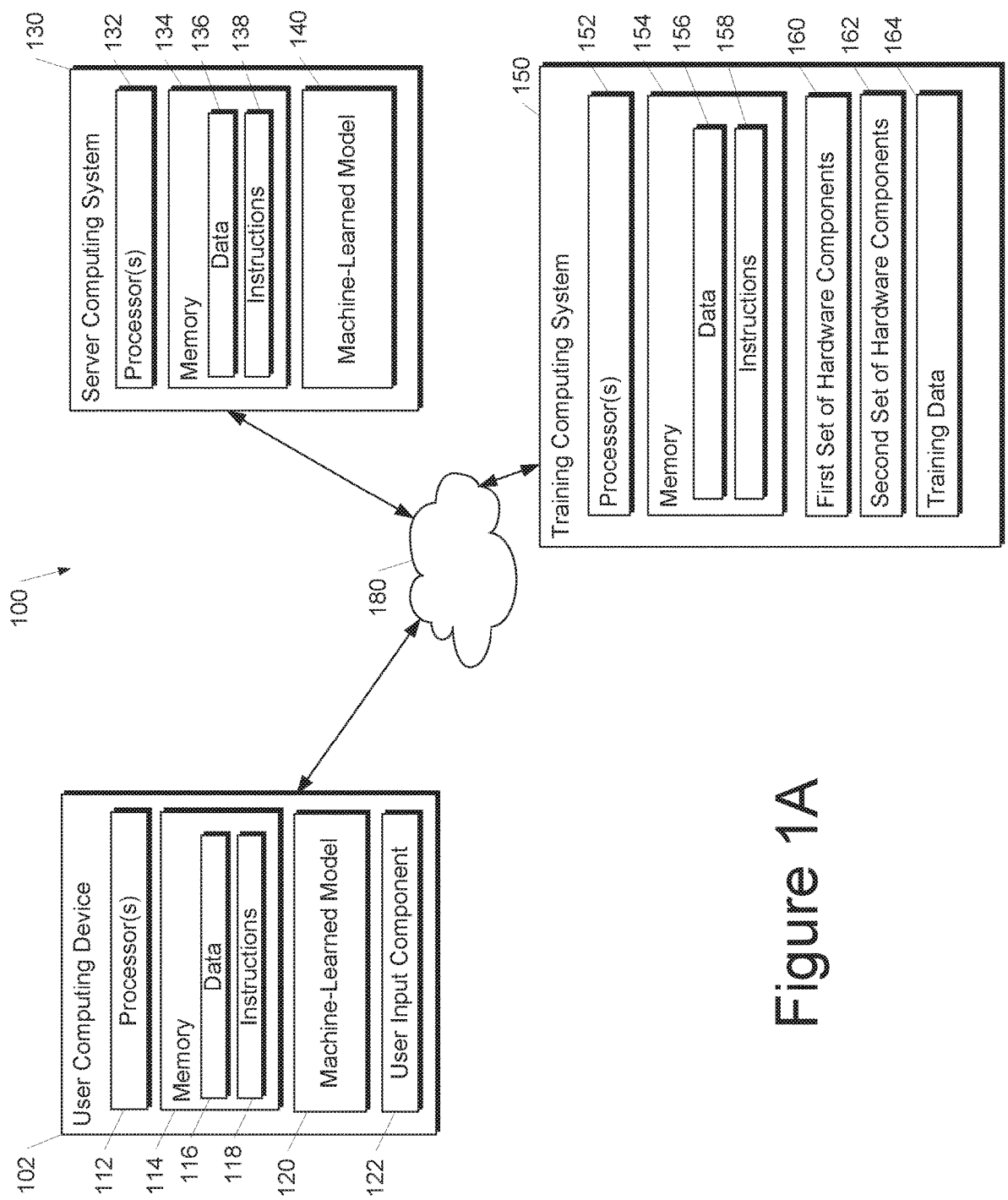
FIG. 1A depicts a block diagram of an example computing system for reducing idleness in a machine-learning training system according to example embodiments of the present disclosure.

Generally, the present disclosure is directed to systems and methods for reducing idleness in a machine-learning training system. A computing system can include a first set of hardware components (e.g., a general-purpose processor and associated memory components) configured to perform a first set of training operations to access and prepare a plurality of training examples included in a set of training data. The computing system can also include a second set of hardware components (e.g., one or more specialized hardware units included in a model training system) configured to perform a second set of training operations to train a machine-learned model based at least in part on the set of training data (e.g., in parallel with performance of the first set of operations). The first set of training operations (which also may be referred to, e.g., as "upstream" processing tasks) can include reading, decoding, shuffling, augmenting, and/or batching the training data to prepare the training data. The first set of training operations, however, can take longer to complete than the second set of training operations (which also may be referred to, e.g., as "downstream" processes), which can including training the model based on the prepared training data (e.g., through performance of gradient descent techniques and/or other training techniques). According to an aspect of the present disclosure, a computing system can perform data echoing to reduce idle time of the "downstream" processes and/or second set of hardware components. More specifically, training iterations can be repeatedly performed for some or all of the training examples such that the second set of hardware components can continue to perform the second set of operations (e.g., train the machine-learned model) even when new or "fresh" training examples are unavailable from the first set of hardware components. Thus, performing repeat iterations can decrease idleness of the system by reducing an "idleness time" when the first set of training operations are being performed but the second set of training operations are not being performed. Furthermore, it has been experimentally shown that this can reduce the number of fresh training examples required to train the machine-learned model to achieve a given performance benchmark.

More specifically, repeat iterations can be performed (e.g., by the second set of computing hardware components) for the same training example for a number of repetitions that is based on an echo factor. The number of repeat iterations for a given training example can be positively correlated with or otherwise based on the echo factor. For instance, an echo factor of two can correspond with a single repeat iteration being performed for each training example resulting in a total of two iterations per training example. The echo factor can be selected to decrease (e.g., minimize, eliminate, etc.) the idleness time. As noted above, the idleness time can be defined as when the first set of training operations (e.g., pre-processing training data) is being performed but the second set of training operations (e.g., training the model based on the pre-processed training data) is not being performed.

According to another aspect of the present disclosure, the echo factor can be based on computational times and/or rates associated with accessing the data and/or training the machine-learned model to minimize the idleness time. More specifically, the echo factor can be based on a comparison of a first computational time associated with performing the first set of training operations with a second computational time associated with performing the second set of training operations. The first computational time and/or second computational time can include or describe an average computational time (e.g., total average time for processing time for a set of training examples having a known size, complexity, etc.) and/or an average computational rate (e.g., training examples per unit time or other suitable metric) associated with accessing the training data and/or training the machine-learned model. The comparison of the first and second computational times can be used to determine a projected time at which the second set of training operations would become idle without data echoing. The echo factor can then be determined such that the first computational time and an adjusted second computational time (including data echoing) are approximately equal such that idleness of the second set of training operations is reduced or eliminated.

In some implementations, each repeat iteration can include a series of training steps. The number of repetitions of the series of training steps can be based, at least in part, on the echo factor. For example, the second set of hardware components (which may, e.g., be referred to as a "model trainer") can input training examples into the machine-learned model and receive training output, as an output of the machine-learned model. The second set of hardware components can evaluate the training output and adjust parameters of the machine-learned model based, at least in part, on the evaluation of the training output. For example, evaluating the training output can include back propagating errors through layers of a neural network of the machine-learned model with respect to a loss function. A variety of suitable methods can be used to adjust parameters of the machine-learned model based on the loss function, including, for example stochastic gradient descent.

In some implementations, data augmentation can be performed for some or all of the training data. Data augmentation can include applying a transformation to a training example to generate additional transformed training examples. As examples, training examples that include images can be resized, mirrored, rotated, cropped, and/or tiled. Additionally or in combination, one or more properties of the training examples can be adjusted, such as brightness, contrast, saturation, etc. Any suitable transformations known in the art can be used. Other types of transformations may be appropriate for other types of training data (e.g., audio, preferences, statistics, etc.).

In some implementations, data augmentation can be included in the second set of training operations (e.g., performed by the second set of hardware components) such that the training example(s) are augmented during one or more of the repeat iterations. As a result, the repeated iterations can be performed with augmented training example(s). In certain contexts, this can improve the training value of the repeated iterations as compared with identical training examples being repeated.

However, in other implementations, data augmentation can be included in the first set of training operations (e.g., performed by the first set of hardware components) such that the training example(s) remain unchanged during the repeat iteration(s). Thus, the machine-learned model can be trained on repeated identical training examples. This configuration can be useful where the training value of the training example(s) is greatest without augmentation. However, it should be understood that, in some implementations, augmentation can be performed both in each of the first and second set of training operations.

In some implementations, an intermediate data buffer can be used to store training data output by the first set of hardware components. The second set of hardware components can access the training data stored in the intermediate data buffer to train the machine-learned model with the training data. Training examples that are included in the training data can also be shuffled (e.g., re-ordered) in the intermediate data buffer or accessed in a non-consecutive manner (e.g., randomly, probabilistically, etc.) from the intermediate data buffer. Thus, the intermediate data buffer can facilitate storage and access of the training examples for training the machine-learned model, including using repeat iterations.

In some implementations, the training example(s) can be probabilistically selected for repeat iterations based on the echo factor such that repeat iterations are performed for some of the training examples but not for others. This can facilitate data echoing at echo factors other than integer values. Training examples can be retrieved from the intermediate data buffer as needed. As noted above, the training examples can be shuffled in the intermediate data buffer and/or accessed non-consecutively. However, in other implementations, training examples can be accessed consecutively such that the same training example is repeated consecutively in the repeat iterations. In one example, an echo factor of 2 can result in repeating iterations for each of the plurality of training examples for a total of two repeat iterations for each training example. An echo factor of 1 can result in no repeating iterations being performed. Probabilistically selecting the training example(s) can facilitate implementations of echo factors that are between one and two by probabilistically selecting training examples for repeat iterations based on the echo factor such that repeat iterations are performed at a desired average rate corresponding with the echo factor. For instance, an echo factor of 1.5 can result in half of the training examples being probabilistically selected for repeat iterations such that a total number of iterations (including fresh training examples and repeat iterations) can equal about 150% of the number of fresh training examples.

The above repeat iterations can be performed for individual training examples and thus can be described as "example-level" data echoing. In contrast, "batch-level" data echoing can be employed in other implementations. For batch-level data echoing, repeat iterations can be performed for each training example of a batch of training examples (e.g., before repeating iterations for any members of the batch of training examples). More specifically, the training steps can be performed for a first training example, then a second training example, and so forth, until the training steps are performed for each training example of the batch. The training steps can then be repeated for each training example of the batch of training examples in the same manner. The training steps can be repeated for the batch for a number of repetitions that is based on the echo factor. Thus, batch-level echoing can be employed by repeating iterations for batches of training examples instead of repeating iterations for individual training examples. Batch echoing can sometimes perform better than example-level echoing with relatively larger batch sizes.

In some implementations, the echo factor can be a static hyperparameter that is manually selected or determined by a user or an operator of the computing system. The echo factor can also be determined (e.g., by the user, operator, or automatically by the computing system) based on information about the hardware components (processing power, available buffer size, etc.) and/or training data (size, complexity, etc.). Thus, the echo factor can be tailored to the system to minimize idleness and optimize efficiency of the model training system.

In other implementations, however, the computing system can dynamically adjust the echo factor (e.g., during training of the machine-learned model). For instance, the computing system can increase the echo factor when new training examples are unavailable or expected to become unavailable. Thus, the model training system can dynamically adjust, in real time, the number of repeat iterations for the training examples based on the availability (or expected availability) of fresh training examples (e.g., from a data buffer).

As another example, the echo factor can be dynamically adjusted based on real-time monitored information about the training processes and/or hardware components used to train the machine-learned model. For example, the computing system can monitor, in real-time, the first computational time associated with performance of the first set of training operations (e.g., by the first set of hardware components) and/or the second computational time associated with performance of the second set of training operations (e.g., by the second set of hardware components). The computing system can dynamically adjust the echo factor in real-time based, at least in part, on the comparison of the first computational time to the second computational time to reduce the idleness time, in real-time (e.g., during training of the machine-learned model). As noted above, the idleness time can be defined as when the first set of training operations are being performed but the second set of training operations are not being performed.

As a further example, the echo factor can be adjusted based on a loss function. The loss function can be evaluated with respect to the machine-learned model and a given training example to determine a loss value for the training example. The echo factor can be positively correlated with the loss value of the training example such that a greater number of repeat iterations are performed for training examples that elicit higher loss values than for training examples that elicit lower loss values. Alternatively, the echo factor can remain the same but training examples can be selected with greater probability for repeat iterations based on having a relatively high associated loss value. Thus, the number of repeat iterations for particular training examples can be intelligently selected to maximize the value of repeating the selected training example.

The repeat iterations can be performed for fewer than all of the training examples of the training data. As one example, the training example(s) can be selected for repeat iterations based on a loss function that is evaluated with respect to at least some of the plurality of training examples and the machine-learned model to determine respective loss values the training examples. Training example(s) having higher associated loss values (e.g., relatively higher compared to loss values of other training examples in the training data) can be favored for repeat iterations. Training example(s) having relatively lower associated loss values can be disfavored for repeat iterations. For instance, a quantity of training examples needed for repeat iterations can be calculated. Respective loss values for the training examples can then be calculated. The training examples can then be ranked according to their respective loss values. A subset of the plurality of training examples can then be selected for repeat iterations based on their respective loss value rank and the required quantity of training examples (e.g., to avoid or reduce idleness). Thus, the computing system can be configured to intelligently improve or maximize the effectiveness of performing the repeat iterations for training the machine-learned model.

As another example, training example(s) can be selected for repeat iterations based on relative positions of the training examples within the training data. Training examples that have been more recently (or most recently) used to train the machine-learned model may be selected for repeat iterations. This can provide the benefit of being simple to implement and potentially requiring fewer computational resources. For instance, calculation of loss values with respect to the training examples can potentially be avoided, for example for machine-learning methods in which calculating loss values is not otherwise required.

As a further example, training example(s) can be selected for repeat iterations based on respective data sources of the training examples. Training examples can be received from a plurality of data sources, including publically available training data sets (e.g., image data sets, audio data sets, etc.) and/or from a user of a mobile device, if the user has so consented. For instance, training data can be obtained or generated based on interactions with the user of the mobile device, user preferences, etc. (e.g., to customize the machine-learned model for the user). Training examples collected from the user of the mobile device can be given preference for repeat iterations over training examples collected from other sources. Importantly, the user can be provided with controls allowing the user to make an election as to both if and when systems, programs, or features described herein can enable collection of user information (e.g., preferences). In addition, certain data can be treated in one or more ways before it is stored or used, so that personally identifiable information is removed. For example, a user's identity can be treated so that no personally identifiable information can be determined for the user. Thus, the user can have control over what information is collected about the user, how that information is used, and what information is provided to the user.

In some implementations, the methods described herein can be performed across multiple hardware components. As indicated above, a first set of hardware components can be configured to execute the first set of training operations to access and prepare the plurality of training examples. The first set of hardware components can store the prepared training examples at an intermediate data buffer. A second set of hardware components can be configured to execute the second set of training operations to access the prepared training examples from the intermediate data buffer and use the prepared training examples to train the machine-learned model.

In some implementations, the first set of hardware components can include one or more general purpose processors, and the second set of hardware components can include one or more application specific integrated circuits. For example, the application specific integrated circuits can include hardware accelerators including graphics processing unit(s) or tensor processing unit(s).

The systems and methods of the present disclosure can provide a number of technical effects and benefits. For example, use of data echoing can reduce idleness and thus improve efficiency for training a machine-learned model, resulting in reduced usage of computing resources such as processor time, network bandwidth, memory usage, and/or the like. Additionally, it has been experimentally shown that data echoing can reduce the number of fresh training examples required to achieve a given performance benchmark. Accordingly, fewer computational resources are needed to access, pre-process, and/or buffer such fresh training examples. Conversely, improved model performance can be achieved using data echoing with a given number of training examples as compared with prior art training methods. Thus, the present methods and system provide a technical improvement to the technical problem of training machine-learned models. Benefits include reduced idleness during training, greater computational efficiency during training, and improved performance for models trained according to the present systems and methods.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A depicts a block diagram of an example computing system 100 that performs reducing idleness in a machine-learning training system according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more machine-learned models 120. For example, the machine-learned models 120 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. An example machine-learned model 120 is discussed with reference to FIG. 2.

In some implementations, the one or more machine-learned models 120 can be received from the server computing system 130 over network 180, stored in the user computing device memory 114, and the used or otherwise implemented by the one or more processors 112. In some implementations, the user computing device 102 can implement multiple parallel instances of a single machine-learned model 120 (e.g., to perform parallel operations across multiple instances of the machine-learned model 120).

Additionally or alternatively, one or more machine-learned model 140 can be included in or otherwise stored and implemented by the server computing system 130 that communicates with the user computing device 102 according to a client-server relationship. For example, the machine-learned model 140 can be implemented by the server computing system 140 as a portion of a web service. Thus, one or more machine-learned models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned models 140. For example, the models 140 can be or can otherwise include various machine-learned models such as neural networks (e.g., deep recurrent neural networks) or other multi-layer non-linear models. An example model 140 is discussed with reference to FIG. 2.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a first set of hardware components 160 and a second set of hardware components 162 configured to perform training operations for one or both of the machine-learned models 140, 120 or a machine-learned model stored at the training computing system 150, for example as described herein with reference to FIG. 2. The first and second sets of hardware components 160, 162 can employ various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 164. In such implementations, the models 120 can be both trained and used locally at the user computing device 102. In some of such implementations, the user computing device 102 can implement the model trainer 160 to personalize the models 120 based on user-specific data.

Figure 1B:
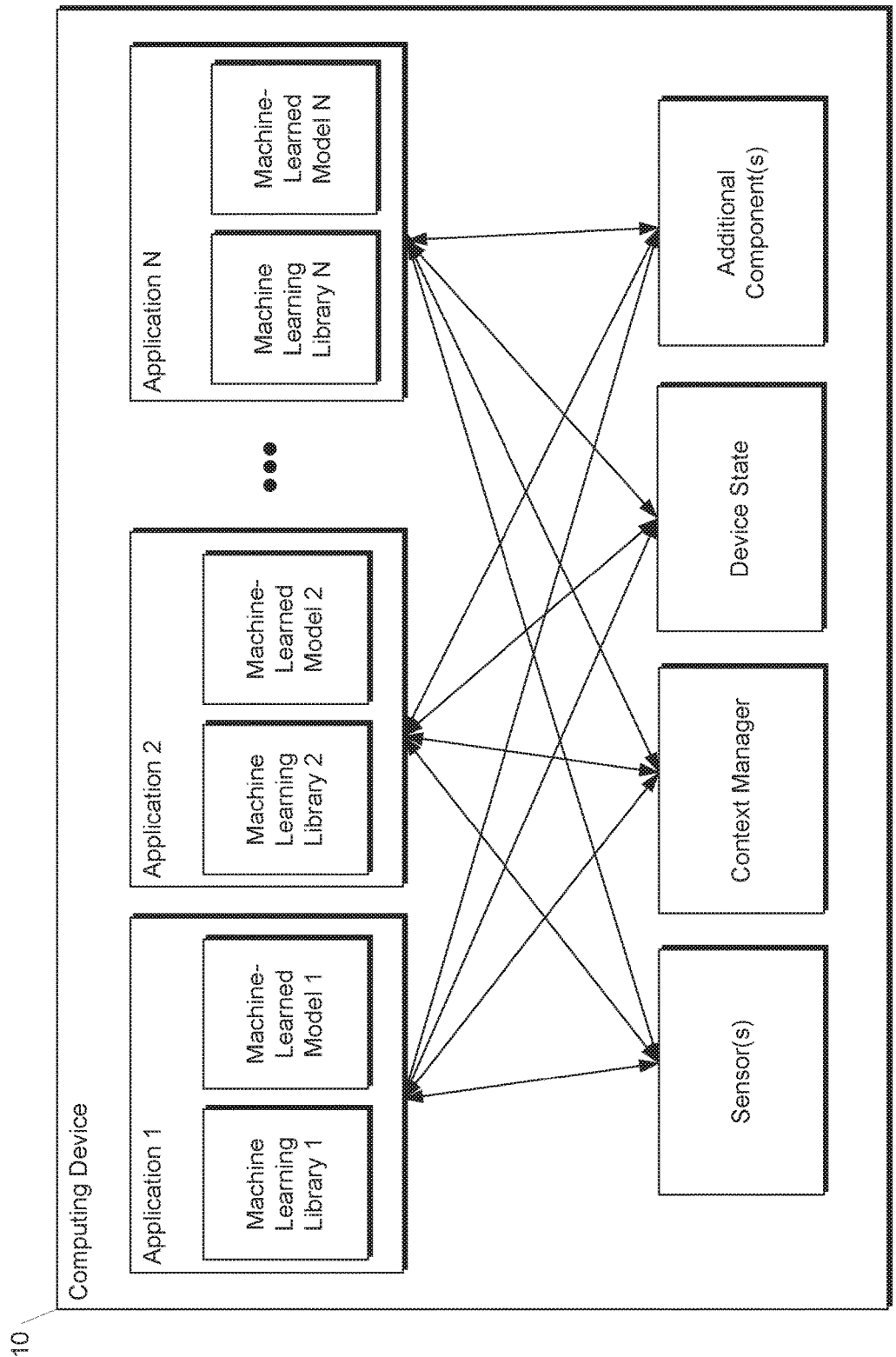
FIG. 1B depicts a block diagram an example computing system for reducing idleness in a machine-learning training system according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
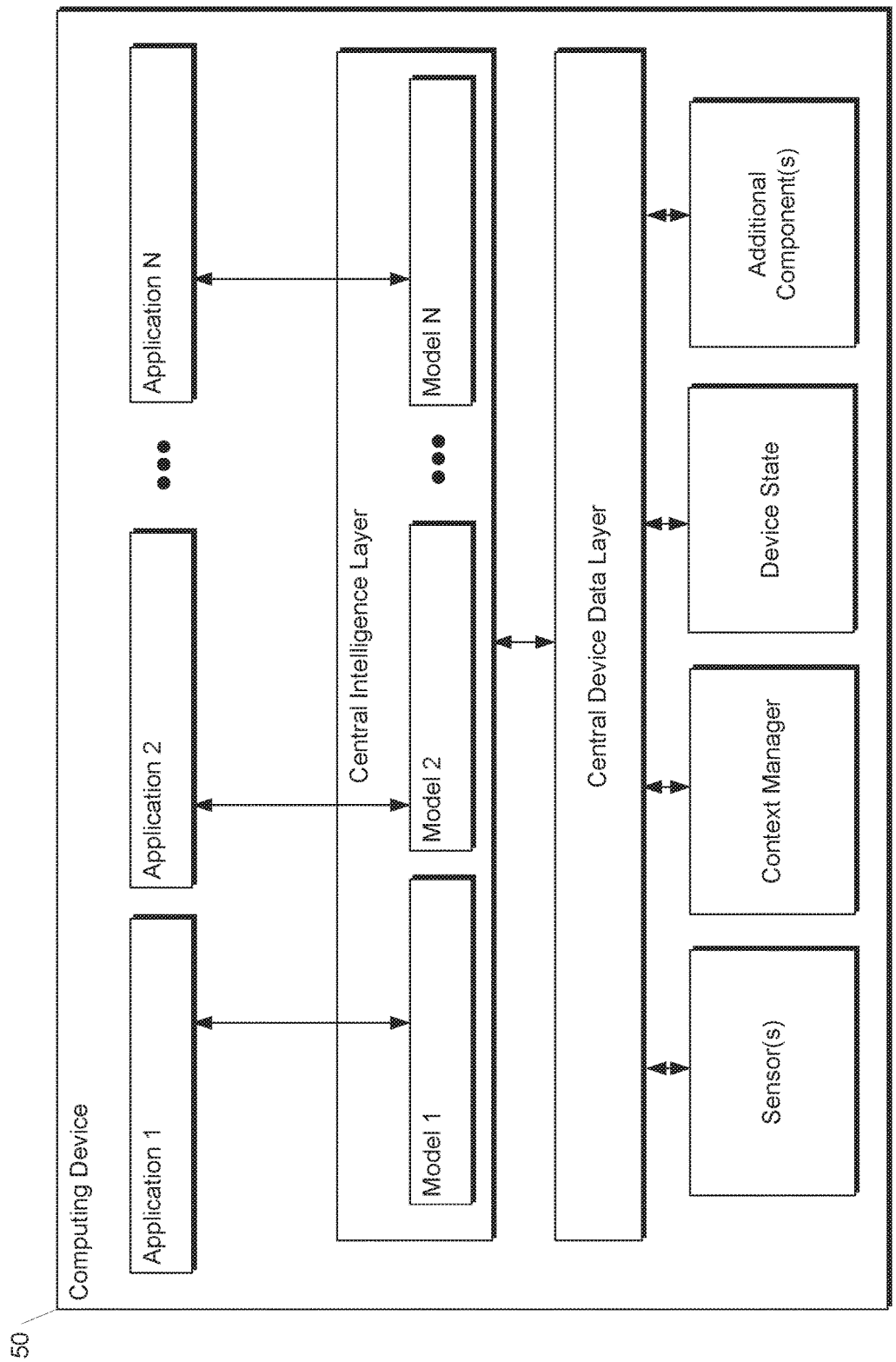
FIG. 1C depicts a block diagram of an example computing system for reducing idleness in a machine-learning training system according to example embodiments of the present disclosure.

FIG. 1C depicts a block diagram of an example computing device 50 that performs according to example embodiments of the present disclosure. The computing device 50 can be a user computing device or a server computing device.

The computing device 50 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

FIG. 2 is a simplified schematic drawing of a computing system 200 configured to perform a training process to train a machine-learned model based on a set training data that comprises a plurality of training examples. In some implementations, the elements of the computing system 200 can be included in the model trainer 160 of the training computing system 150 of FIG. 1. The computing system 200 can include a computer-readable storage disk 201, a first set of hardware components 202, an intermediate data buffer 204, and a second set of hardware components 206. The computer-readable storage disk 201 and/or intermediate data buffer 204 may correspond with the memory 154 of FIG. 1A. The first and second sets of hardware components 202, 206 may correspond with the first and second sets of hardware components 160, 162 of FIG. 1A. The computing system 200 can be configured to perform a training process to train a machine-learned model, for example as described below with reference to the machine-learned model 300 of FIG. 3 and the methods 400, 500 of FIGS. 4 and 5. The computing system 200 can train the machine-learned model 300 based on training data that includes a plurality of training examples. The computer-readable storage disk 201 can be configured to store the plurality of training examples.

The first set of hardware components 202 can be configured to execute a first set of training operations to access the plurality of training examples from the computer-readable storage disk 201 and prepare the plurality of training examples for use in training the machine-learned model. The first set of hardware components 202 can include one or more general purpose processors. The first set of hardware components 202 can store the prepared training examples at the intermediate data buffer 204, which can be configured to store the prepared training examples.

More specifically, the intermediate data buffer 204 can be used to store training data output by the first set of hardware components 202. The second set of hardware components 206 can access the training data stored in the intermediate data buffer 204 to train the machine-learned model with the training data. Training examples that are included in the training data can also be shuffled in the intermediate data buffer 204 or accessed in a non-consecutive manner (e.g., randomly, probabilistically, etc.) from the intermediate data buffer 204. Thus, the intermediate data buffer 204 can facilitate storage and access of the training examples for training the machine-learned model, including using repeat iterations.

The second set of hardware components 206 can include one or more application specific integrated circuits. For example, the application specific integrated circuits can include hardware accelerators including graphics processing unit(s) or tensor processing unit(s).

The second set of hardware components 206 can be configured to execute a second set of training operations to access the prepared training examples from the intermediate data buffer 204 and to use the prepared training examples to train the machine-learned model. The second set of hardware components 206 can be configured to perform one or more repeat iterations in which the second set of hardware components 206 repeatedly access the prepared training example(s) from the intermediate data buffer 204 and repeatedly uses the prepared training example(s) to train the machine-learned model. A rate at which the second set of hardware components 206 is configured to perform the repeat iteration(s) can be based at least in part on the echo factor, for example as described herein. The echo factor can be based at least in part on a comparison of a first computational time associated with performance of the first set of training operations by the first set of hardware components 202 to a second computational time associated with performance of the second set of training operations by the second set of hardware components 206.

Example Model Arrangements

FIG. 3 depicts a block diagram of an example machine-learned model 300 according to example embodiments of the present disclosure. In some implementations, the machine-learned model 300 can be trained to receive training example(s) 302 included in a set of training data and, as a result of receipt of the training example(s) 302, provide training output 304, for example by the second set of hardware components 206 described above with reference to FIG. 2. The training output 304 can include any suitable output of the machine-learned model 300. Examples include object detection/recognition output, sound recognition/identification output, natural language output, embeddings, and/or any other suitable output for machine-learned models.

The training example(s) 302 can include a variety of suitable training data types (e.g., images, audio, video, sensor data, statistics, etc.). The training example(s) 302 can be received from a plurality of data sources, including publically available training data sets (e.g., image data sets, audio data sets, sensor data sets, etc.) and/or from a user of a mobile device (e.g., the user computing device 102 of FIG. 1A). For instance, training data can be obtained or generated based on interactions with the user of the mobile device, user preferences, etc. (e.g., to customize the machine-learned model 300 for the user). In some implementations, training examples collected from the user of the mobile device can be given preference for repeat iterations over training examples collected from other sources. Importantly, the user can be provided with controls allowing the user to make an election as to both if and when systems, programs, or features described herein can enable collection of user information (e.g., preferences). In addition, certain data can be treated in one or more ways before it is stored or used, so that personally identifiable information is removed. For example, a user's identity can be treated so that no personally identifiable information can be determined for the user. Thus, the user can have control over what information is collected about the user, how that information is used, and what information is provided to the user.

Example Methods

Figure 4:
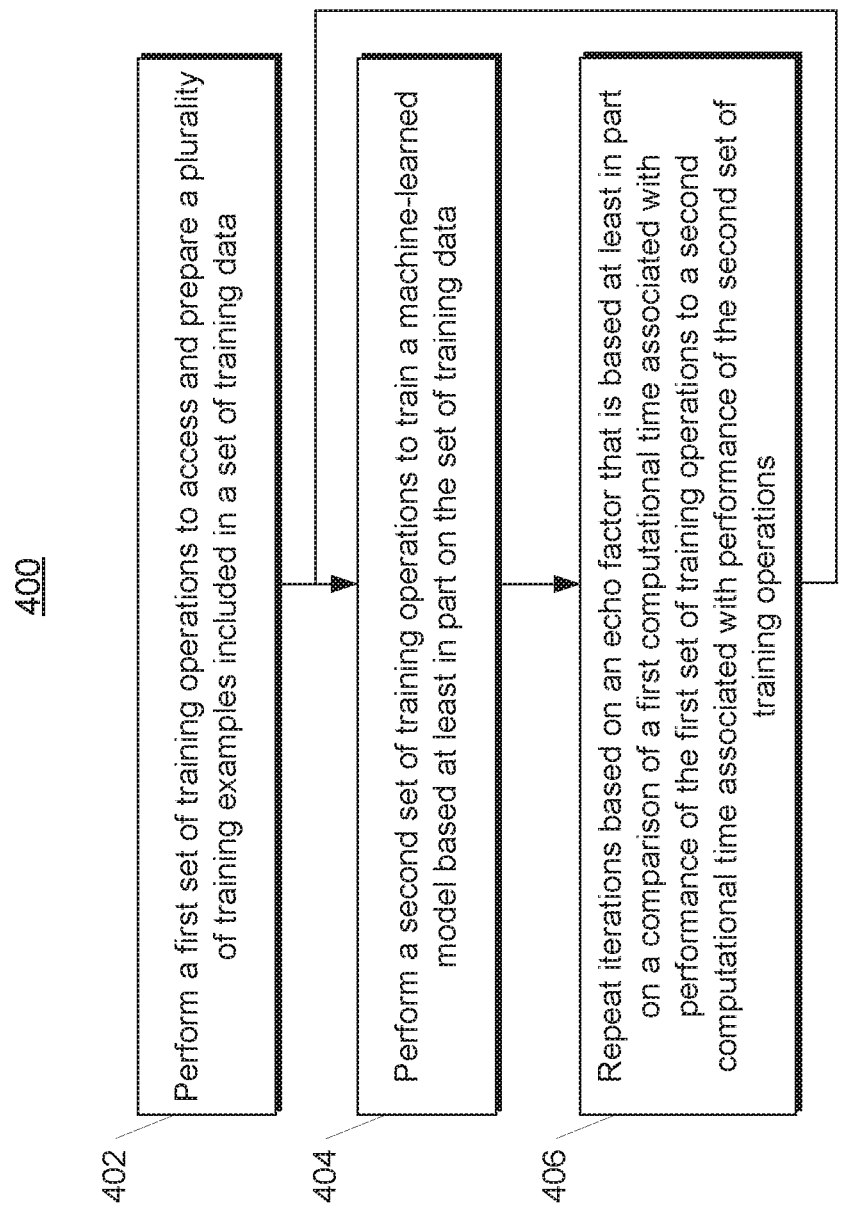
FIG. 4 depicts a flow chart diagram of an example method for reducing idleness in a machine-learning training system according to example embodiments of the present disclosure.

FIG. 4 depicts a flow chart diagram of an example method 400 for reducing idleness in a machine-learning training system according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can perform a first set of training operations to access and prepare a plurality of training examples included in a set of training data. As examples, the first set of training operations can include reading, decoding, shuffling, augmenting, and/or batching the training data. The first set of training operations can be performed by a first set of hardware components, for example as described with reference to FIGS. 3 and 5. Other suitable training operations can be performed to access and prepare the training examples, however. Suitable training operations can be selected depending on the properties of the machine-learned model being trained and/or properties of the training data (e.g., size, complexity, type, etc.).

At 404, the computing system can perform a second set of training operations to train the machine-learned model based at least in part on the set of training data. The second set of training operations can include inputting training examples into the machine-learned model and adjusting parameters of the machine-learned model based on an evaluation of training output received from the machine-learned model, for example as described with reference to FIG. 5. The second set of training operations can be performed by a second set of hardware components, for example as described herein with reference to FIGS. 3 and 5.

At 406, the computing system can repeat iterations (e.g., some or all of the second set of training operations 404) based on an echo factor that is based at least in part on a comparison of a first computational time associated with performance of the first set of training operations 402 to a second computational time associated with performance of the second set of training operations 404. The repeat iterations can be included in the second set of training operations 404 and/or performed by the second set of hardware components.

More specifically, repeat iterations can be performed, at 406, (e.g., by the second set of computing hardware components) for the same training example for a number of repetitions that is based on an echo factor. The number of repeat iterations for a given training example can be positively correlated with or otherwise based on the echo factor. For instance, an echo factor of two can correspond with a single repeat iteration being performed for each training example resulting in a total of two iterations per training example. The echo factor can be selected to decrease (e.g., minimize, eliminate, etc.) the idleness time (e.g., of the second set of computing devices). As noted above, the idleness time can be defined as when the first set of training operations, at 402, (e.g., pre-processing training data) is being performed but the second set of training operations, at 404, (e.g., training the model based on the pre-processed training data) is not being performed.

The echo factor can be based on computational times and/or rates associated with accessing the data and/or training the machine-learned model to minimize the idleness time. More specifically, the echo factor can be based on a comparison of a first computational time associated with performing the first set of training operations 402 to a second computational time associated with performing the second set of training operations 404. As examples, the first and/or second computational times can include or describe average computational times (e.g., total average time for processing time for a set of training examples having a known size, complexity, etc.) and/or an average computational rate (e.g., training examples per unit time or other suitable metric) associated with the first set of training operations 402 and/or the second set of training operations 404. The computational times can include other suitable metric useful for estimating when idleness time can occur or determining a number of repeat iterations needed to reduce or eliminate the idleness time.

For example, the comparison of the first and second computational times can be used to determine a projected time at which the second set of training operations 404 would become idle without data echoing. The echo factor can then be determined such that the first computational time and an adjusted second computational time (including data echoing) are approximately equal such that idleness of the second set of training operations 404 is reduced or eliminated.

In some implementations, the training example(s) can be probabilistically selected for repeat iterations, at 406, based on the echo factor such that repeat iterations are performed for some of the training examples but not for others. This can facilitate data echoing at echo factors other than integer values. For instance, in one example, an echo factor of 2 can result in consecutively repeating iterations for each of the plurality of training examples for a total of two repeat iterations for each training example. An echo factor of 1 can result in no repeating iterations being performed. Probabilistically selecting the training example(s) can facilitate implementations of non-integer echo factors, (e.g., between one and two) by probabilistically skipping training examples for repeat iterations based on the echo factor such that repeat iterations are performed at a desired average rate corresponding with the echo factor. For instance, an echo factor of 1.5 can result in about half of the training examples being probabilistically skipped such that a total number of iterations (including fresh training examples and repeat iterations) can equal about 150% of the number of fresh training examples. Thus, probabilistic selection of training examples can be employed to achieve non-integer echo factors, which can be used to more precisely adjust or tune the number of repeat iterations and thereby reduce idleness time.

The above repeat iterations can be performed, at 406, for individual training examples and thus can be described as "example-level" data echoing. In contrast, "batch-level" data echoing can be employed in other implementations. For batch-level data echoing, repeat iterations can be performed (e.g., sequentially) for each training example of a batch of training examples. More specifically, a set of training steps (e.g., some or all of the second set of training operations 404) can be performed for a first training example, then a second training example, and so forth, until the training steps of the second set of training operations 404 are performed for each training example of the batch. The training steps set of the second set of training operations 404 can then be repeated for each training example of the batch of training examples in the same manner. The training steps (e.g., some or all of the second set of training operations 404) can be repeated for the batch for a number of repetitions that is based on the echo factor. Thus, batch-level echoing can include repeating iterations for batches of training examples instead of repeating iterations for individual training examples.

It has been discovered that batch echoing can sometimes perform better than example-level echoing, for example with relatively larger batch sizes. Example-level echoing can also sometimes require more shuffling than batch-level echoing.

In some implementations, the echo factor can be a static hyperparameter that is manually selected or determined by a user or an operator of the computing system. The echo factor can also be determined (e.g., by the user, operator, or automatically by the computing system) based on information about the hardware components (e.g., processing power, available buffer size, etc.) and/or training data (e.g., size, complexity, etc.). Thus, the echo factor can be tailored or customized to the system to minimize idleness and optimize efficiency of the model training system.

In other implementations, the computing system can dynamically adjust the echo factor (e.g., during performance of the first set of training operations 402 and/or the second set of training operations 404). For instance, the computing system can increase the echo factor when new training examples are unavailable or expected to become unavailable (e.g., from the first set of training operations 402). Thus, the model training system can dynamically adjust, in real time, the number of repeat iterations for the training examples based on the availability (or expected availability) of fresh training examples.

As another example, the echo factor can be dynamically adjusted based on real-time monitored information about the training processes and/or hardware components used to train the machine-learned model. For example, the computing system can monitor, in real-time, the first computational time associated with performance of the first set of training operations 402 (e.g., by the first set of hardware components) and/or the second computational time associated with performance of the second set of training operations 403 (e.g., by the second set of hardware components). The computing system can dynamically adjust the echo factor in real-time based, at least in part, on the comparison of the first computational time to the second computational time to reduce the idleness time, in real-time (e.g., during training of the machine-learned model). As noted above, the idleness time can be defined as when the first set of training operations 402 are being performed but the second set of training operations 404 are not being performed.

As a further example, the echo factor can be adjusted based on a loss function. The loss function can be evaluated with respect to the machine-learned model and a given training example to determine a loss value for the training example, for example as described below with reference to step 518 of the method 500 of FIG. 5. The echo factor can be positively correlated with the loss value of the training example such that a greater number of repeat iterations, at 406, are performed for training examples that elicit higher loss values than for training examples that elicit lower loss values. Thus, the number of repeat iterations for particular training examples can be intelligently selected to maximize the value of repeating the selected training example.

The repeat iterations can be performed, at 406, for fewer than all of the training examples of the training data. As one example, the training example(s) can be selected for repeat iterations, at 406, based on a loss function that is evaluated with respect to at least some of the plurality of training examples and the machine-learned model to determine respective loss values the training examples. Training example(s) having higher associated loss values (e.g., relatively higher compared to loss values of other training examples in the training data) can be favored for repeat iterations, at 406. Training example(s) having relatively lower associated loss values can be disfavored for repeat iterations, at 406. For instance, a quantity of training examples that is needed for repeat iterations, at 406, can be calculated (e.g., to prevent or minimize the idleness time). Respective loss values for the training examples can then be calculated. The training examples can then be ranked according to their respective loss values. A subset of the plurality of training examples can then be selected for repeat iterations, at 406, based on their respective loss value rank and the required quantity of training examples (e.g., to avoid or reduce idleness). Thus, the computing system can be configured to intelligently improve or maximize the effectiveness of performing the repeat iterations, at 406, for training the machine-learned model.

As another example, training example(s) can be selected for repeat iterations, at 406, based on relative positions of the training examples within the training data. Training examples that have been more recently (or most recently)

used to train the machine-learned model may be selected for repeat iterations, at 406. This can provide the benefit of being simple to implement and potentially requiring fewer computational resources. For instance, calculation of loss values with respect to the training examples can potentially be avoided, for example for machine-learning methods in which calculating loss values is not otherwise required.

As a further example, training example(s) can be selected for repeat iterations, at 406, based on respective data sources of the training examples. As indicated above, training examples can be received from a plurality of data sources, including publically available training data sets (e.g., image data sets, audio data sets, etc.) and/or from a user of a mobile device, if the user has so consented. Training data can be obtained or generated based on interactions with the user of the mobile device, user preferences, etc. (e.g., to customize the machine-learned model for the user). Training examples collected from the user of the mobile device can be given preference for repeat iterations over training examples collected from other sources.

Figure 5:
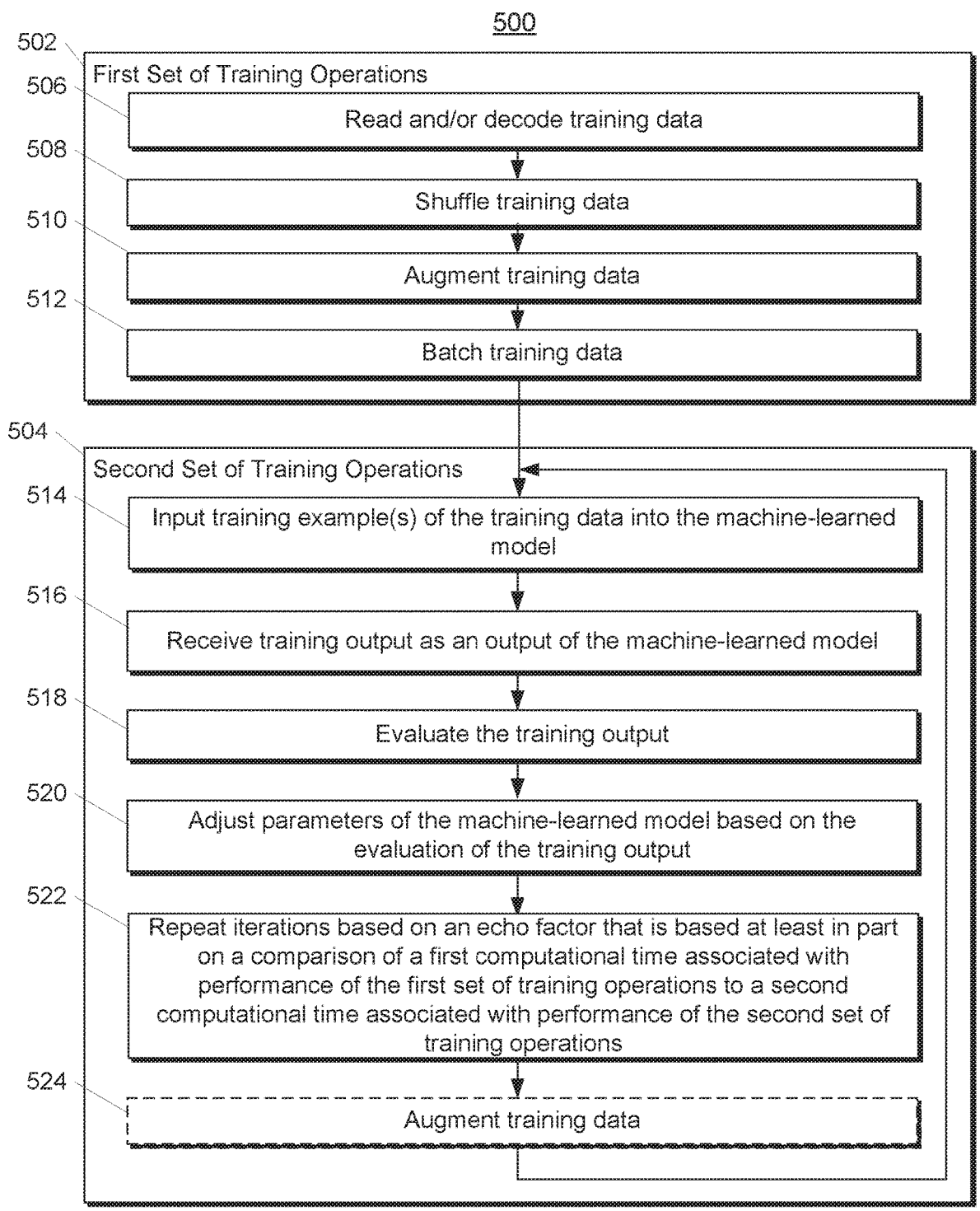
FIG. 5 depicts a flow chart diagram of another example method for reducing idleness in a machine-learning training system according to example embodiments of the present disclosure.

FIG. 5 depicts a flow chart diagram of an example method 500 for reducing idleness in a machine-learning training system according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

The method 500 can include a first set of training operations 502 to access and prepare a plurality of training examples included in a set of training data and a second set of training operations 504 to train a machine-learned model based at least in part on the set of training data. The first set of training operations 502 can be performed by a first set of hardware components, and the second set of training operations 504 can be performed by a second set of hardware components, for example as described above with reference to FIGS. 3 and 4.

The first set of operations 502 can include a variety of preparation operations with respect to the training data. For example, the first set of operations 502 can include reading and/or decoding the training data at 506, shuffling the training data at 508, augmenting the training data at 510, and/or, batching the training data at 512. Other suitable training operations can be performed to access and prepare the training examples, however. Suitable training operations can be selected depending on the properties of the machine-learned model being trained and/or properties of the training data (e.g., size, complexity, type, etc.).

Augmenting the training data, at 510, can include include applying a transformation to a training example to generate additional transformed training examples. As examples, training examples that include images can be resized, mirrored, rotated, cropped, and/or tiled. Additionally or in combination, one or more properties of the training examples can be adjusted, such as brightness, contrast, saturation, etc. Any suitable transformations known in the art can be used. Other types of transformations may be appropriate for other types of training data (e.g., audio, preferences, statistics, etc.).

Thus, one or more training examples can be augmented, at 510, by applying a transformation to the training example(s) in the first set of training operations 502 (e.g., by the first set of hardware components) such that the training example(s) remain unchanged during the repeat iteration(s), at 522, in the second set of operations 504. Thus, the machine-learned model can be trained on repeated identical training examples. This configuration can useful where the training value of the training example(s) is greatest without augmentation. However, in some implementations, data augmentation can additionally or alternatively be included in the second set of training operations 504, for example as described below with reference to augmenting the training data at 524.

The second set of operations 504 can include a series of training operations to train the machine-learned model based at least in part on the training data. For example, at 514, the second set of hardware components can input the training example(s) of the set of training data into the machine-learned model. At 516, the second set of hardware components can receive one or more training outputs as an output of the machine-learned model, for example as described above with reference to FIG. 3.

At 518, the second set of hardware components can evaluate the training output(s), for example as described above with reference to FIG. 3. Evaluating the training output, at 518, can include evaluating a loss function with respect to the training output of the machine-learned model. Errors can be back propagated through layers of a neural network of the machine-learned model with respect to the loss function.

At 520, the second set of hardware components can adjust parameters of the machine-learned model based at least in part on the evaluation of the at least one training output. A variety of suitable methods can be used to adjust parameters of the machine-learned model based on the loss function, including, for example stochastic gradient descent.

At 522, repeat iterations can be performed for some or all of the training examples based on an echo factor that is based, at least in part, on a comparison of a first computational time associated with performance of the first set of training operations 502 to a second computational time associated with performance of the second set of training operations 504, for example as described above with reference to FIG. 4. For example, the training example(s) can be probabilistically selected for repeat iterations (e.g., steps 514-520) based on the echo factor such that repeat iterations are performed for some of the training examples but not for others. This can facilitate data echoing at echo factors other than integer values. Training examples can be retrieved from the intermediate data buffer as needed. As noted above, the training examples can be shuffled in an intermediate data buffer and/or accessed non-consecutively. However, in other implementations, training examples can be accessed consecutively such that the same training example is repeated consecutively in the repeat iterations.

In one example, an echo factor of 2 can result in repeating iterations for each of the plurality of training examples for a total of two repeat iterations, at 522, for each training example. An echo factor of 1 can result in no repeating iterations, at 522, being performed. Probabilistically selecting the training example(s) can facilitate implementations of echo factors that are between one and two by probabilistically selecting training examples for repeat iterations, at 522, based on the echo factor such that repeat iterations, at 522, are performed at a desired average rate that corresponds with the echo factor. For instance, an echo factor of 1.5 can result in half of the training examples being probabilistically selected for repeat iterations, at 522, such that a total number of iterations (including fresh training examples and repeat iterations) can equal about 150% of the number of fresh training examples.

The above repeat iterations, at 522, can be performed for individual training examples and thus can be described as "example-level" data echoing. In contrast, "batch-level" data echoing can be employed in other implementations. For batch-level data echoing, repeat iterations, at 522, can be performed for each training example of a batch of training examples (e.g., before repeating iterations for any members of the batch of training examples). More specifically, the training steps (e.g., steps 514-520) can be performed for a first training example, then a second training example, and so forth, until the training steps are performed for each training example of the batch. The training steps can then be repeated for each training example of the batch of training examples in the same manner. The training steps (e.g., steps 514-520) can be repeated, at 522, for the batch for a number of repetitions that is based on the echo factor. Thus, batch-level echoing can be employed by repeating iterations, at 522, for batches of training examples instead of repeating iterations for individual training examples. Batch echoing can sometimes perform better than example-level echoing with relatively larger batch sizes.

In some implementations, data augmentation, at 524, can be performed in the second set of training operations 504. One or more of the training examples can be augmented, at 524 such that the training example(s) are augmented during one or more of the repeat iterations, at 522. Although illustrated as after repeating iterations, at 522, it should be understood that augmenting the training data, at 524, can be performed in conjunction with the repeat iterations, at 522 such that some or all of the repeated iterations, at 522, can be performed with augmented versions of the fresh training example(s). In certain contexts, this can improve the training value of the repeated iterations as compared with identical training examples being repeated. In some implementations, data augmentation can be performed in both the first set of training operations 502 (e.g., at 510) and second set of training operations 504 (e.g., at 524).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method for reducing idleness in a machine-learning training system, the method comprising:
    performing, by one or more computing devices, a first set of training operations to access and prepare a plurality of training examples included in a set of training data; and
    performing, by the one or more computing devices, a second set of training operations to train a machine-learned model based at least in part on the set of training data;
    wherein performing, by the one or more computing devices, the second set of training operations comprises performing, by the one or more computing devices, one or more repeat iterations in which at least a portion of the second set of training operations are repeatedly performed for at least one training example of the plurality of training examples included in the set of training data such that the at least one training example is repeatedly used to train the machine-learned model; and
    wherein a rate of the one or more repeat iterations is based at least in part on an echo factor that is based at least in part on a comparison of a first computational time associated with performance of the first set of training operations to a second computational time associated with performance of the second set of training operations.

2. The method of claim 1, wherein performing, by the one or more computing devices, the one or more repeat iterations decreases an idleness time that occurs when the one or more computing devices are performing the first set of training operations but not the second set of training operations.

3. The method of claim 1, wherein performing, by the one or more computing devices, the one or more repeat iterations comprises:
    for each of a plurality of iterations:
        inputting, by the one or more computing devices, the at least one training example of the set of training data into the machine-learned model;
        receiving, by the one or more computing devices, as an output of the machine-learned model, at least one training output;
        evaluating, by the one or more computing devices, the at least one training output; and
        adjusting, by the one or more computing devices, parameters of the machine-learned model based at least in part on the evaluation of the at least one training output;
    wherein a number of the plurality of iterations is based at least in part on the echo factor.

4. The method of claim 3, further comprising augmenting, by the one or more computing devices, the at least one training example by applying a transformation to the at least one training example.

5. The method of claim 4, wherein said augmenting, by the one or more computing devices, the at least one training example is included in the first set of training operations such that the at least one training example does not change during the one or more repeat iterations.

6. The method of claim 4, wherein said augmenting, by the one or more computing devices, the at least one training example is included in the second set of training operations such that the at least one training example is augmented during each of the one or more repeat iterations.

7. The method of claim 1, wherein performing, by the one or more computing devices, the one or more repeat iterations further comprises:
performing, by the one or more computing devices, training steps for each of a batch plurality of training examples of the set of training data;
repeating, by the one or more computing devices and for a number of repetitions that is based on the echo factor, the training steps for each of the batch plurality of training examples of the training data.

8. The method of claim 1, further comprising dynamically adjusting, by the one or more computing devices, the echo factor.

9. The method of claim 1, further comprising:
monitoring, by the one or more computing devices in real-time, one or both of:
the first computational time associated with performance of the first set of training operations; and
the second computational time associated with performance of the second set of training operations; and
dynamically adjusting, by the one or more computing devices in real-time, based at least in part on the comparison of the first computational time associated with performance of the first set of training operations to the second computational time associated with performance of the second set of training operations to reduce in real-time an idleness time that occurs when the one or more computing devices are performing the first set of training operations but not the second set of training operations.

10. The method of claim 1, further comprising:
evaluating, by the one or more computing devices, a loss function with respect to the at least one training example and the machine-learned model to determine a loss value for the at least one training example; and
adjusting, by the one or more computing devices, the echo factor based on the loss value.

11. The method of claim 1, further comprising:
evaluating, by the one or more computing devices, a loss function with respect to at least two of the plurality of training examples and the machine-learned model to determine a respective loss value for each of the at least two of the plurality of training examples; and
selecting, by the one or more computing devices, the at least one training example from the plurality of training examples based on the respective loss values of the at least two of the plurality of training examples.

12. The method of claim 1, further comprising selecting, by the one or more computing devices, the at least one training example based on at least one of:
a relative position of the at least one training example within the plurality of training examples; or
a data source of the at least one training example.

13. The method of claim 1, further comprising probabilistically selecting, by the one or more computing devices, the at least one training example based on the echo factor such that repeat iterations are performed for fewer than all of the plurality of training examples.

14. A computing system configured to perform a training process to train a machine-learned model based on a set training data that comprises a plurality of training examples, the computing system comprising:
a computer-readable storage disk configured to store the plurality of training examples;
a first set of hardware components configured to execute a first set of training operations to access the plurality of training examples from the computer-readable storage disk, prepare the plurality of training examples for use in training the machine-learned model, and store the prepared training examples at an intermediate data buffer;
the intermediate data buffer configured to store the prepared training examples; and
a second set of hardware components configured to execute a second set of training operations to access the prepared training examples from the intermediate data buffer and to use the prepared training examples to train the machine-learned model;
wherein the second set of hardware components are configured to perform one or more repeat iterations in which the second set of hardware components repeatedly access at least one of the prepared training examples from the intermediate data buffer and repeatedly use the at least one of the prepared training examples to train the machine-learned model; and
wherein a rate at which the second set of hardware components are configured to perform the one or more repeat iterations is based at least in part on an echo factor that is based at least in part on a comparison of a first computational time associated with performance of the first set of training operations by the first set of hardware components to a second computational time associated with performance of the second set of training operations by the second set of hardware components.

15. The computing system of claim 14, wherein the first set of hardware components comprise one or more general purpose processors and the second set of hardware components comprises one or more application specific integrated circuits.

16. The computing system of claim 15, wherein the application specific integrated circuits comprise hardware accelerators comprising one or more graphics processing units or tensor processing units.

17. The computing system of claim 14, wherein performing the one or more repeat iterations decreases an idleness time that occurs when the first set of hardware components are performing the first set of training operations but the second set of hardware components are not preforming the second set of training operations.

18. The computing system of claim 14, wherein performing the one or more repeat iterations comprises:
for each of a plurality of iterations:
inputting, by the one or more computing devices, the at least one training example of the plurality of training examples into the machine-learned model;
receiving, by the one or more computing devices, as an output of the machine-learned model, at least one training output;
evaluating, by the one or more computing devices, the at least one training output; and
adjusting, by the one or more computing devices, parameters of the machine-learned model based at least in part on the evaluation of the at least one training output;
wherein a number of the plurality of iterations is based at least in part on the echo factor.

19. The computing system of claim 14, wherein the first set of hardware components is further configured to augment the at least one training example in the first set of training operations by applying a transformation to the at least one training example such that the at least one training example does not change during the one or more repeat iterations.

20. The computing system of claim 14, wherein the second set of hardware components is further configured to augment the at least one training example is the second set of training operations by applying a transformation to the at least one training example such that the at least one training example is augmented during each of the one or more repeat iterations performed by the second set of hardware components.

* * * * *